United States Patent [19]

Bettens

[11] 4,044,497

[45] Aug. 30, 1977

[54] KIT WITH MALE AND FEMALE ELEMENTS HAVING DEFORMABLE GRIPPING MEANS

[75] Inventor: Jean-Paul Bettens, Morges, Switzerland

[73] Assignee: Modulo S.A., Le Sentier, Switzerland

[21] Appl. No.: 634,863

[22] Filed: Nov. 24, 1975

[30] Foreign Application Priority Data

Dec. 4, 1974 Switzerland ............ 16073/70

[51] Int. Cl.$^2$ ........................... A63H 33/10
[52] U.S. Cl. ........................... 46/17; 46/23; 46/29; 46/31; 403/170; 403/173; 403/331
[58] Field of Search ............... 46/16, 17, 23, 25, 26, 46/28, 29, 30, 31, 19, 21; 403/170, 173, 331

[56] References Cited

U.S. PATENT DOCUMENTS

| | | | |
|---|---|---|---|
| 2,063,895 | 12/1936 | Mack | 46/28 |
| 2,410,874 | 11/1946 | Greenberg et al. | 46/29 |
| 2,683,329 | 7/1954 | Kobler | 46/29 |
| 2,869,692 | 1/1959 | Hassett | 46/31 |
| 3,456,413 | 7/1969 | Fischer | 46/28 X |
| 3,500,606 | 3/1970 | Wharmby | 46/25 X |
| 3,657,838 | 4/1972 | Hanning et al. | 46/19 |

FOREIGN PATENT DOCUMENTS

1,298,281  5/1962  France ................ 46/23

Primary Examiner—F. Barry Shay
Attorney, Agent, or Firm—Ostrolenk, Faber, Gerb & Soffen

[57] ABSTRACT

A construction kit comprises male and female elements, preferably of molded plastic material, for assembly into various model structures. The male elements have cubic bodies with studs protruding from two or more faces and the female elements are elongated U-section pieces having corresponding square end walls with keyhole-shaped openings for receiving and gripping shanks of the studs whose heads are guided and held between the lateral walls of the female elements. The male elements can be formed of interengaging pieces, and may possibly be pivotally joined. The kit may include various accessories such as panels, struts, pulleys, wheels with removable toothed rings or tines, a motor and so forth to complete the desired structure.

8 Claims, 20 Drawing Figures

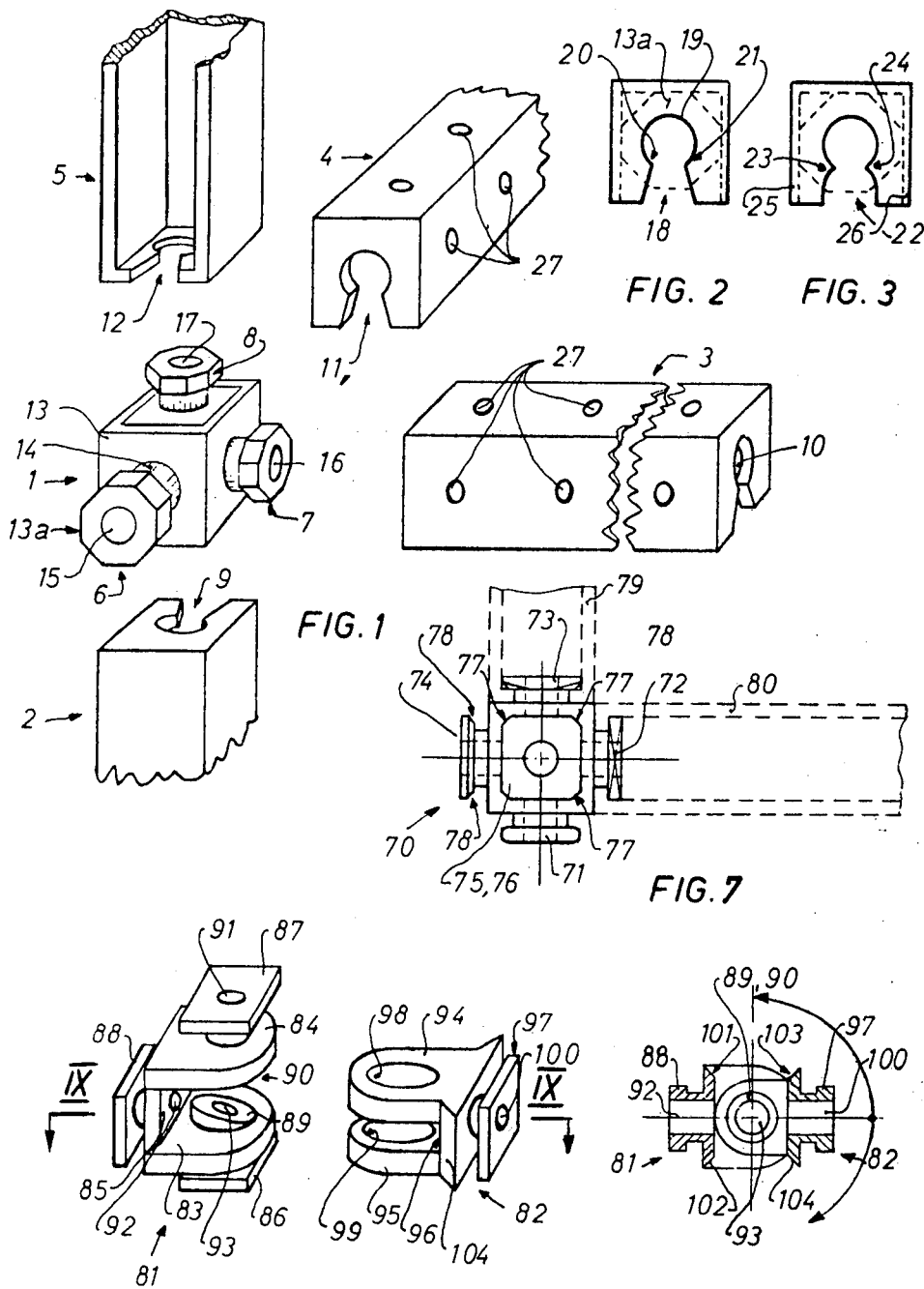

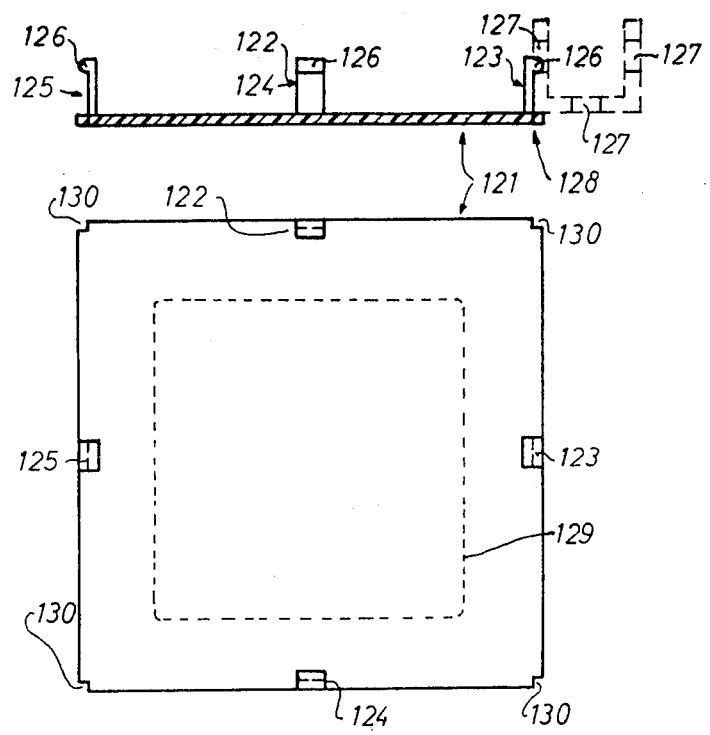
FIG. 10
FIG. 11
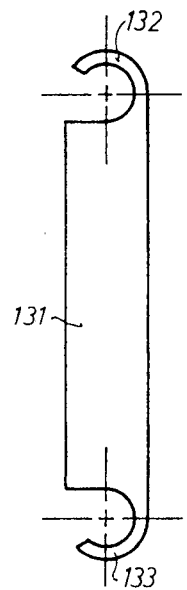
FIG. 12

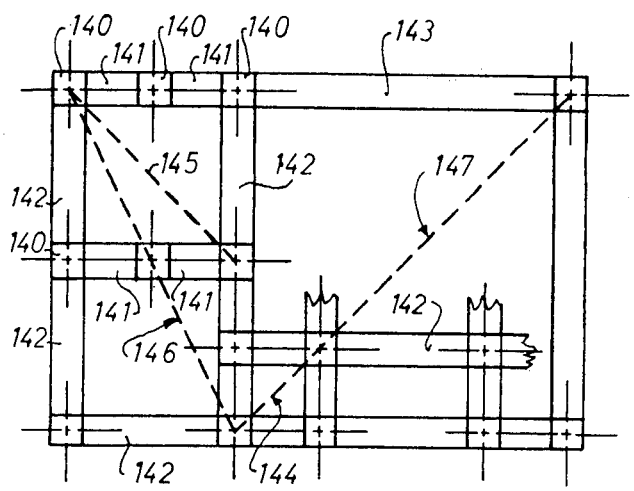
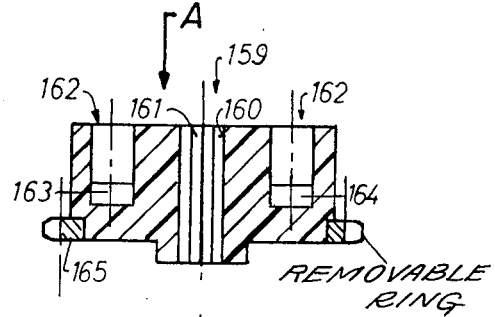
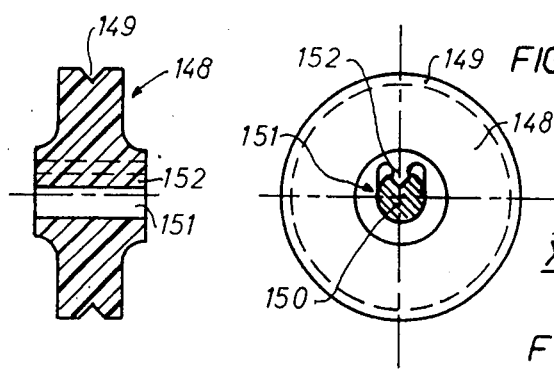
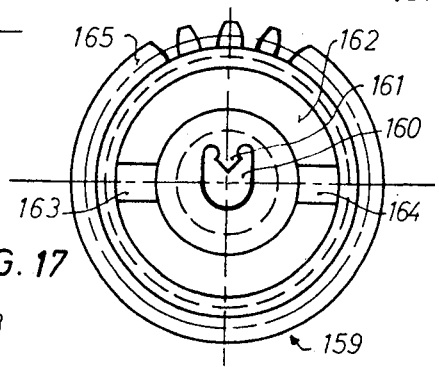
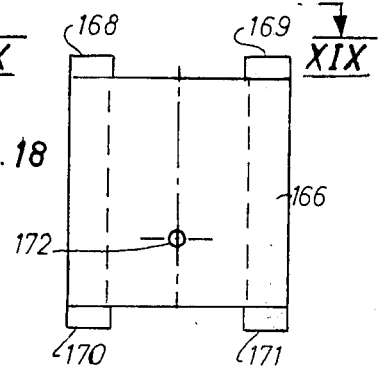
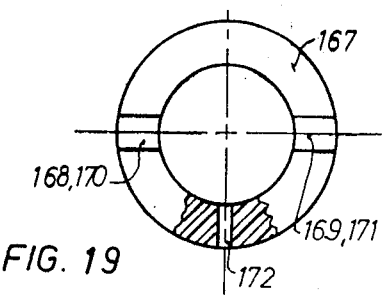

KIT WITH MALE AND FEMALE ELEMENTS HAVING DEFORMABLE GRIPPING MEANS

The invention relates to model construction kits for the construction of model machines, apparatus, buildings and so on.

Such kits comprise a set of several functional elements that can be assembled to form the desired structure. Many arrangements for securing together or connection of such elements have been proposed, and the invention specifically relates to kits the elements of which can be assembled without nuts and bolts or the like.

A known construction kit comprises elongate elements of square section whose lateral faces have longitudinal dovetail grooves. The ends of the elements have a tenon which can be received in the grooves, so that one element may be slidably connected at right angles to and along the lateral groove of another. This system has several disadvantages. Firstly, the tenon can be removed from the groove by flexion, and is even able to turn in the groove since the material of the tenon is a polymer which must be quite elastic to avoid breakage thereof. Also, the second element does not remain fixed to the first at a desired location, as the tenon can freely slide along the groove.

An aim of the invention is to remove these disadvantages and to propose a new universal construction kit of elements that can be assembled easily with rigid, firm connections without nuts and bolts or other similar means, which elements can be manufactured at low cost and have, when assembled, a satisfactory aesthetic appearance.

According to the invention, a construction kit comprises a plurality of male and female assembly elements. The male elements are in the form of cubic bodies each having at least two securing members protruding from faces thereof. The female elements are in the form of elongate pieces of square section of dimensions corresponding to the square faces of the cubic bodies and these female elements have elastically-deformable gripping means defining an opening for receiving a securing member of a cubic body. Each securing member has a first part which can be introduced in a said opening by elastic deformation of the gripping means and which is held in said opening by the gripping means and it has a second guiding and positioning part having opposite rectilinear edges slidably receivable in and bearing against corresponding walls of the female element.

In a preferred embodiment, the securing member is in the form of a tenon. The first part of the tenon is a cylindrical shank which can be introduced into and retained in a major circular arcuate part of an opening in an end wall of a female element by forced passage through a narrow passageway formed by two elastically deformable facing projections bounding said arcuate part of the opening, the second guiding and positioning part of the securing member being in the form of a polygonal head on said shank, the faces of the polygonal head being guided and positioned by inner walls of the female element.

With this arrangement, an assembly of a male and a female element is maintained firmly by the polygonal head whose faces bearing against the inner walls of the female element prevent any relative rotation. Also, during insertion of the securing member in the opening of the female element, the faces of the polygonal head guide the two elements while they move relative to one another until the male element is in place relative to the female element, i.e., when the shank of the securing member fits in the circular part of the opening after having forcibly passed through the gripping means.

According to a characteristic of the invention, the end walls of the female element have outwardly opening keyholeshaped openings for receiving gripping members.

The elements of a kit according to the invention are preferably fabricated by moulding a synthetic polymeric material having the required resilience to permit insertion of the male element in the openings of the female elements against the resistance of the gripping means of the latter. Preferred polymeric materials are polyamides (nylon, "Perlon," Trade Mark, "Grillon," Trade Mark), polycarbonates ("Makrolon," Trade Mark) and, especially, polyacetals ("Delrin," Trade Mark). The structural configuration of all of the elements will in general be chosen so that simple and hence cheap moulds can be used. As will be seen from the following description of embodiments, the elements described by way of example can suitably meet this economic requirement.

The accompanying drawings show, by way of example, several embodiments and variations of elements of a construction kit according to the invention. In the drawings:

FIG. 1 is an exploded perspective view of a male element and end parts of four female elements;

FIG. 2 is an end elevational view of a female element, showing its opening for receiving a male element;

FIG. 3 is a view similar to FIG. 2, showing a varied form of opening;

FIG. 7 is a plan view of a male element connecting two female elements at right angles;

FIG. 8 shows another embodiment of male element comprising two articulated parts;

FIG. 9 is a cross-section taken along line IX—IX of FIG. 8, with the element assembled;

FIG. 10 is a cross-section through a plate which can be assembled with male and female elements to form a frame;

FIG. 11 is a plan view of the plate of FIG. 10;

FIG. 12 is a view of a strut adapted to couple two male elements and form a diagonal in an assembled structure;

FIG. 13 illustrates various possibilities of assembly of male elements with female elements of three different lengths;

FIG. 14 is a cross-section through a circular element of the construction kit, in particular for use as a pulley;

FIG. 15 is a side view of the pulley of FIG. 14;

FIG. 16 is a cross-section through a toothed wheel forming an element of the construction kit;

FIG. 17 is a side view of the toothed wheel of FIG. 16;

FIG. 18 is an elevational view of a cylindrical piece which can be assembled with two wheels as shown in FIG. 17 to form a winding drum;

FIG. 19 is an end view from line XIX—XIX of FIG. 18; and

Figure 4:
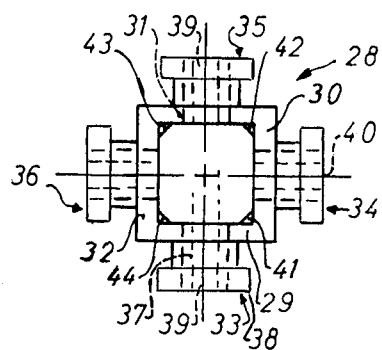
FIGS. 4, 5 and 6 show a specific embodiment of a male element.

Male elements 1 each with a cubic body have tenons or studs 6, 7, 8 on faces thereof for engagement in corresponding openings 9, 10, 11, 12 in end faces of respective female elements 2, 3, 4 and 5. Each stud 6, 7, 8 has a cylindrical shank 14 extending from the center of a face 13 of the cubic body, followed by a part 13a in the form of an octogonal head placed so that two pairs of its parallel edges are parallel to edges of the face 13 of the cubic body carrying the stud.

In the embodiment of FIG. 1, each face of the cubic body has a securing stud, three only being shown. However, the male element 1 may for example have only four studs on four lateral faces of the cubic body, the top and bottom faces being free. Some male elements may also have only two securing studs, for example on two adjacent faces of the cubic body. Such arrangements can be provided as a function of the use of the element, and all combinations of two or more studs can be envisaged.

The male element 1 also has through bores 15, 16 and 17 passing through the centers of the opposite faces of the cubic body and through the studs, these bores serving to receive axles of suitable diameter.

The female elements 2, 3, 4, 5 (see FIG. 1) are each in the form of an elongate piece of square U-section having the same external dimensions (width and height) as the square faces of the cubic body of elements 1, but open along one face. The closed, square ends of the female elements have the above-mentioned openings in which the studs 6, 7, 8 can be secured.

FIGS. 2 and 3 are end-on views of female elements with the stud-receiving openings. FIG. 2 shows a keyhole-shaped opening 18 extending into the open face of the element. The stud 6, 7, or 8 of male element 1 (FIG. 1) is thus introduced through the wide edge of opening 18 (FIG. 2) to come to lodge in circular part 19 after having been forced through the narrow part of opening 18 formed by two facing projections 20 and 21. The circular part 19 of opening 18 extends over a major arcuate part of a circle with substantially the same diameter as the the cylindrical shank 14 of the studs, so that when shank 14 is lodged in the circular part 19 of opening 18 after having pushed apart the two projections 20 and 21, the latter return to their initial position and grip the shank 14 in the circular part 19. The octogonal head 13a is dimensioned so that the distance between two opposite faces is equal to the distance between the inner faces of the side walls of female elements 2, 3, 4 and 5 (see FIG. 2). With this arrangement, the male element 1 cannot turn in the circular part 19 of opening 18, but will be held in the female element in a fixed position. Furthermore, it can be seen that each stud-carrying face of a male element 1 can be secured in a female element 2, 3, 4 or 5 in eight different angular relative positions. For four of these positions, the faces of the cubic body of element 1 will be in extension of the end faces of the female element; for the four remaining positions, the faces of the cubic body will be at 45° to the end faces of the female element. To facilitate the insertion of a male element in a female element, the head 13a may be chamfered, as will be described with reference to FIG. 7, on its face towards the cubic body. Also, the angles between adjacent faces of the octogonal head may be rounded.

FIG. 3 shows a varied form of generally keyhole-shaped opening 22 in a female element enabling a connection of the male and female elements which is more difficult to separate than for the opening shown in FIG. 2. To this end, the opening 22 has facing projections 23 and 24 which are more pointed than projections 20 and 21, and consequently provide a tighter grip on the shanks 14.

To permit an easy insertion of the studs in openings 9, 10, 11, 12, 18 and 22, the female elements must have a resilience such that the projections 20, 21 or 23, 24 and, with them, the corresponding lateral walls, as 25, 26 of FIG. 3, are able to separate from one another and return to their initial position. For this reason, the female elements are preferably made by moulding a suitable plastics material.

To permit the construction of structures of different dimensions, the female elements will be provided with several different lengths, selected for example so that one female element will have the same length as two shorter female elements assembled in alignment with one another by a male element. The choice of the lengths of the female elements will be discussed in detail with reference to FIG. 13.

The three faces of the female elements forming their U-section also have bores 27 disposed at uniform distances equal to the side of the cubic body of the male element, to receive axles able to freely turn in these bores.

Figure 5:
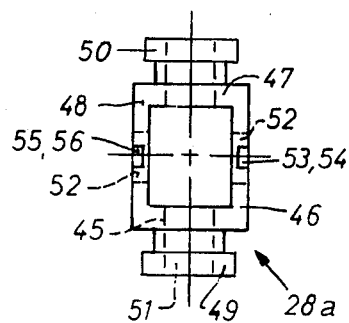
Figure 6:
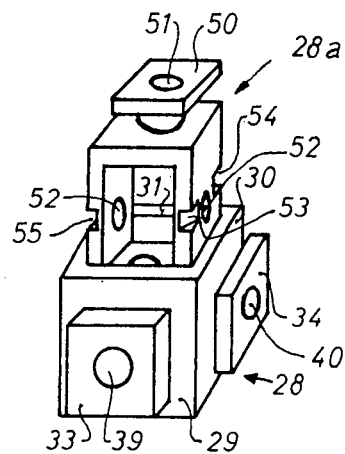

FIGS. 4 to 6 show a specific embodiment of male element, formed of two sleeve-like pieces 28, 28a of moulded plastics material arranged to fit together.

As shown in FIG. 4, piece 28 has a cubic body formed of four lateral walls 29 to 32 with an opening of square section through opposite (top and bottom) faces. At the center of each lateral wall 29 to 32 is a respective securing stud 33, 34, 35, 36 having a cylindrical shank 37 and a square head. The male element of FIGS. 4 to 6 can thus no longer, as that of FIG. 1, be secured an angle of 45° to the female elements, but can occupy four angular positions relative to the female elements at angles of 90° to one another about the longitudinal axis of the female element. Piece 28 has two through bores 39 and 40 passing through the centers of studs 33, 35 and 34, 36 respectively. On the inner edges of piece 28 are also provided gussets 41, 42, 43 and 44 for engagement in corresponding grooves of the piece 28a, as explained further on.

The piece 28a shown in FIGS. 5 and 6 is able to close and complete the just-described piece 28. It comprises a rectangular central part formed of four walls 45, 46, 47 and 48 dimensioned so that piece 28a can be inserted in the opening of piece 28 and close it completely. Walls 46 and 48 thus have a length corresponding exactly to the depth of cubic piece 28 and walls 45 and 47 have a dimension corresponding to the square inner section of piece 28. The walls 45 and 47 carry central securing studs 49, 50 respectively, similar to the studs of piece 28, with a through bore 51 of piece 28a passing through the centers of studs 49, 50. Walls 46 and 48 also have a central through bore 52 of the same diameter as bores 39 and 40 of piece 28 and as the bore 51. Four grooves 53, 54, 55 and 56 are arranged in the middle of the outwardly facing longer edges of walls 46 and 48, for a mating fit with the gussets 41 to 44 of piece 28 when the piece 28a is introduced therein. The just-described pieces 28, 28a are such that piece 28a can be introduced in piece 28 with a slight friction, and a firm connection between the two pieces is provided by engagement of the gussets 41 to 44 in grooves 53 to 56 when the main part of piece 28a is completely inside the central opening of piece 28 to form a male element with a cubic body having securing studs on its six faces. In this assembled position, bore 52 of piece 28 is in exact alignment with bore 40 through studs 34 and 36 of piece 28, so that an axle may be fitted through the bore 40, or through the bores 39 or 51.

The just-described male elements should have low friction surfaces to enable easy coupling with the female elements. They are thus, for example, in nylon.

FIG. 7 is an underneath view of an assembly of a male element similar to that described in FIGS. 4 to 6, with two female elements forming an angle of 90°. The male element has tenons or studs 71, 72, 73, 74, 75, 76 on its six faces, each stud having a cylindrical shank and a square head. It is observed (see studs 75, 76) that the corners 77 of the studs are rounded and (see studs 73, 74) that the face of the square head facing towards the cubic body is bevelled at 78, these two features facilitating introduction into the female elements 79, 80. In the example of FIG. 7, only two studs are used to form a right-angled corner.

The male element shown in FIGS. 8 and 9 is formed of a piece 81 arranged to receive a piece 82 mounted for rotation through an angle of 180° in a plane. Piece 81 is formed of two parallel plates 83 and 84 integral with and spaced apart from one another by a spacer 85. Each of plates 83 and 84 and spacer 85 has on its outer face a respective securing stud 86, 87 and 88, similar to the studs of the male element of FIGS. 4 to 6. On the inner faces of plates 83, 84 are facing bevelled dowels 89 and 90 on which piece 82 comes to engage. The dowels are bevelled so that their part furthest away from spacer 85 is flush with the inner face of the respective plate 83, 84, whereas the part nearest spacer 85 has a height of approximately one-fourth the distance between plates 83 and 84. As the outer part of the bevel of dowels 89 and 90 is in the plane of the inner faces of plates 83 and 84, the piece 82 can be easily introduced in piece 81, by elastic deformation of the two pieces which are provided in a resilient plastics material. Piece 81 also has bores 91, 92, 93 through studs 87, 88 and 86 respectively. These bores 91 to 93 may as those described with reference to FIGS. 1 to 7 receive axles for the construction of various structures.

Piece 82 has two parallel plates 94 and 95 connected by a spacer 96 carrying on its outer face a securing stud 97 similar to studs 86 to 88 of piece 81. The distance between the external faces of plates 94, 95 is substantially equal to the distance between the inner faces of plates 83, 84 of piece 81. Plates 94, 95 have aligned circular bores 98, 99 having the same diameter as dowels 89, 90. Piece 82 also has a bore 100 passing through stud 97. Pieces 81, 82 are of a resilient material so that piece 81 can be pushed in piece 82 and clip-fitted together by introduction of the bevelled dowels 89, 90 in bores 98, 99. When the two pieces are assembled, as shown in FIG. 9, they form an articulated male element, piece 82 being able to pivot through an angle of 180° about dowels 89, 90 of piece 81.

The spacers 85, 96 have inclined edge faces 101, 102 and 103, 104 respectively, inclined at 45° (see FIG. 9). Faces 101, 103 and 102, 104 abut against one another to limit pivoting of piece 82 relative to piece 81 through 180°.

As the female elements must be resilient to be able to receive the studs of the male elements, they will preferably be in suitable plastics materials, such as polymers (polyamides, polycarbonates or polyacetals). They may be made by moulding.

FIGS. 10 and 11 show a square panel 121 for clipping onto and closing a square frame formed of four male elements and four female elements similar to those of FIGS. 1 to 7. The edges of panel 121 have substantially the same length as the female elements and have central clips 122, 123, 124, 125 each protruding perpendicular to one face of the panel 121 and terminating with an outwardly directed bulge 126 arranged to be able to engage in bores in the walls of the female elements. FIG. 10 shows a female element in cross-section in a dashed line, with bores 127 in the middle of its side walls, and the bulge 126 of clip 123 engaging in one of these bores 127. It can be seen on FIG. 10 that the outer edges 128 of panel 121 slightly overlap the corresponding inner edges of the assembled female elements. When the clips 122 to 125 are in place, the panel 121 will be lightly pressed against the female elements forming the frame. The central part of panel 121 may be open as indicated by dashed line 129 to provide a window. Panel 121 also has recesses 130 at its four outer corners to facilitate placing of the panel, by engagement of these recesses 130 with corresponding edges of the cubic bodies of the male elements forming corners of the frame.

FIG. 12 shows a joining strut for use as a diagonal element. Strut 131 is made as thin as practicable and has hooks 132, 133 at its ends arranged to engage about the cylindrical shanks of the securing studs of the male elements. Hooks 132, 133 are resiliently deformable for clipping engagement about these shanks. The struts 131 are hence made in the same type of plastics material as the described female elements.

FIG. 13 schematically shows a structure formed by an assembly of male elements 140 with female elements 141, 142 and 143 of different lengths. Let us suppose that the male elements 140 have a cubic body whose side has a length of one unit. The shortest female elements 141 have a length of two units. Medium-length female elements 142, which can replace two short elements 141 assembled by a male element 140, have a length of five units. The longest female elements 143 can replace two medium elements 142 assembled by a male element 140, and thus have a length of eleven units.

To sum up, a construction kit represented by the example of FIG. 13 has male elements with a cubic body having a side length of one unit, and female elements two, five and 11 units long. In a preferred embodiment, not shown, the cubic body has a side of 12mm, the short female elements are 18mm long, the medium ones 48mm long, and the long ones 108mm long, all of the female elements having a square section of the unit length, 12mm. It is of course possible to also include female elements of other lengths, for example of three and seven units.

The construction kit also includes struts similar to those of FIG. 12 of four lengths, diagrammatically shown in dashed lines on FIG. 13 and referenced 144, 145, 146 and 147. With elements of the described dimensions, it is possible to construct a great variety of structures. In addition to the diagonal struts of various lengths, panels as shown in FIG. 11 and 12 can be provided with several dimensions, for example with sides of two and five units.

FIGS. 14 and 15 show a pulley 148 with a circular peripheral groove 149. Pulley 148 is mounted on a longitudinally grooved axle 150 (FIG. 15) keyed in a bore 151 of pulley 148, this bore having a projecting longitudinal lip 152 which engages in the groove of the axle 150 and holds the pulley axially by friction.

FIG. 16 is a cross-section through a toothed wheel 159, and FIG. 17 an elevational view of wheel 159 looking along arrow A of FIG. 16. Wheel 159 has a central bore 160 with a longitudinal lip 160 like that of the pulley of FIG. 15. The wheel 159 also has a lateral circular groove 162 including two diametrically opposite recesses 163 and 164 extending to a greater depth, for a purpose that will be explained later. On its periphery, wheel 159 has a removable externally toothed ring 165 fitted by friction. This ring can be removed to allow the wheel to be used as a roller. It would also be possible to replace the toothed ring 165 by another ring, for example having the shape of a tire.

FIGS. 18 and 19 show a hollow cylinder 166 of section chosen to be able to fit in the groove 162 of wheel 159. At each of its ends cylinder 166 has two diametrically opposite studs 168, 169 and 170, 171 respectively, able to engage in the recesses 163, 64 of wheel 159. Cylinder 166 also has a transverse bore 172.

It can easily be seen that two toothed wheels 159 can be assembled with a cylinder 166 to form a drum for winding a string or chain. The two ends of cylinder 166 are simply inserted into the grooves 162 of two wheels 159 with the studs 168, 169 and 170, 171 engaging in the recesses 163, 164 of the respective wheels 159, and the assembly is mounted on an axle, not shown. Bore 172 can receive the end of a string or chain wound about the drum. To drive the drum, the construction kit can include a crank handle, or a motor for driving one of the toothed wheels of the drum. Such a motor could be fixed on a chassis or in a case having keyhole-shaped openings like the female elements, so that it can be secured on the securing studs of male elements.

Figure 20:
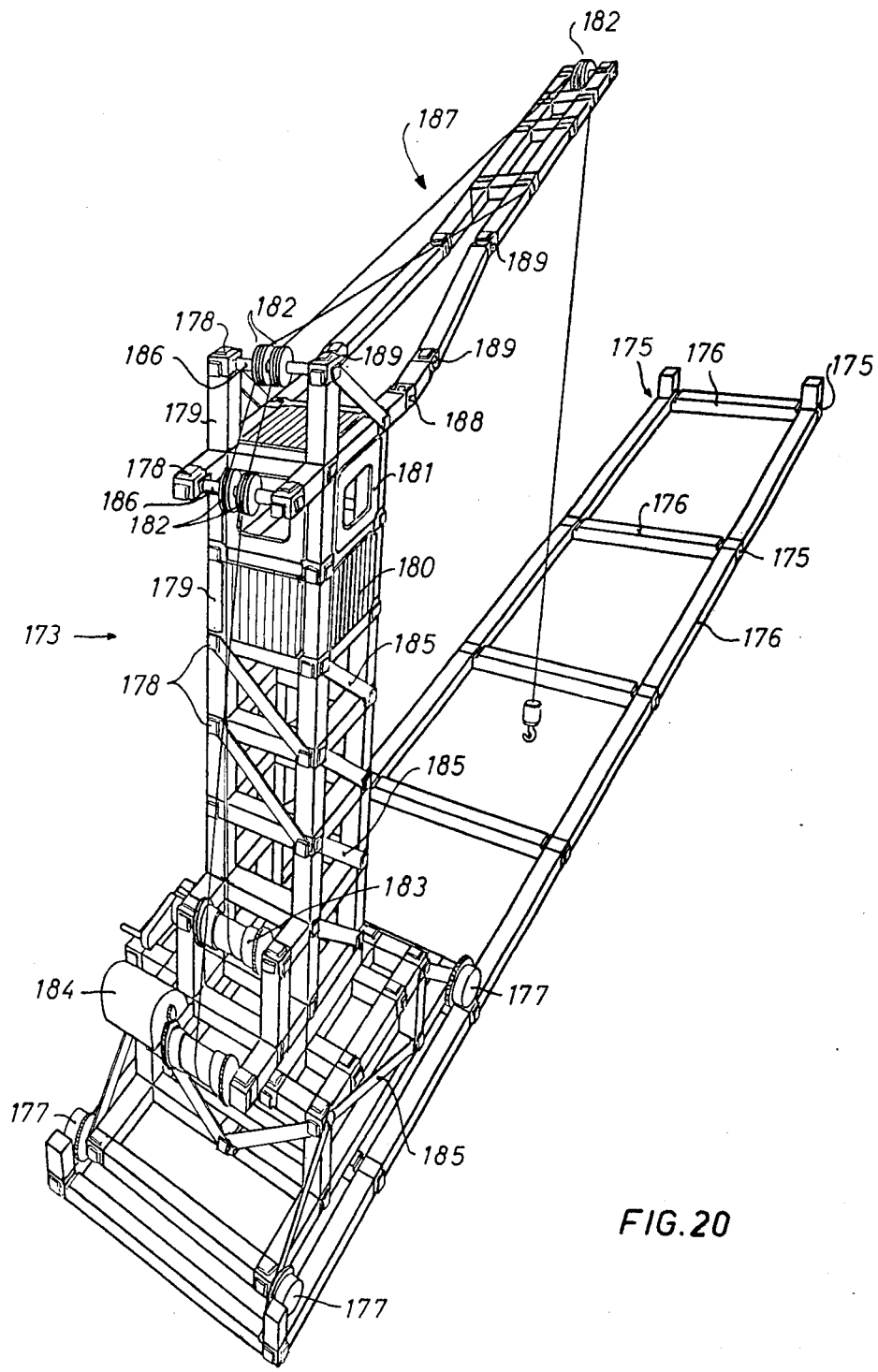
FIG. 20 is a perspective view of a crane assembled from the elements shown in FIGS. 1 to 19.

FIG. 20 shows a model crane 173 assembled from the elements of FIGS. 1 to 19. Crane 173 has four wheels 177 resting on rails formed of male elements 175 and female elements 176. The crane body comprises, in addition to male elements 178 and female elements 179 of various lengths, closed panels 180 and window panels 181, pulleys 182, drums 183, a motor housed in a casing 184, diagonal struts 185 of various lengths, and axles 186. The crane arm 187 is articulated about a transverse horizontal axis by means of articulated male elements 188, like those of FIGS. 8 and 9. The arm 187 includes further similar articulated male elements 189 which do not pivot during use of the crane, but provide a tapered portion of the arm 187.

As mentioned above, all of the elements of FIGS. 1 to 19 are preferably of plastics material. However, elements which do not have to undergo resilient deformation, for example the male elements and the wheels, may be made in other materials, for example light metal.

It will be appreciated from the above that the described new construction kit provides a new constructional game the elements of which can be rapidly assembled in a solid and rigid manner and easily dismantled without any screws or the need for any tools. Moreover the elements and their connections are robust and universal and can be produced at a reasonable cost. The new kit is not only an amusing and educative toy for children, but can also serve for the construction of complex technical models.

A varied form of female element (not shown) comprises, in addition to or in lieu of the keyhole-shaped openings in its end walls, similar keyhole-shaped openings at various locations along its lateral walls, opening into the open face of the female element, to receive the studs of male elements. In this case, the inner face of these lateral walls will be provided with partitions or ribs adjacent the openings and against which the opposite edges of an inserted head of a stud will bear and be guided.

What is claimed is:

1. A construction kit comprising a plurality of male and female assembly elements, said male elements being in the form of cubic bodies having square faces of predetermined dimensions, each said body having at least two securing members protruding from respective said faces, said securing members being in the form of tenons, each said tenon having a cylindrical shank, each said tenon having a guiding and positioning part in the form of a polygonal head on said shank, said polygonal head having side faces, said female elements being in the form of elongate pieces of square section of said predetermined dimensions, each said female element having an end wall, said end wall having an opening therein with a major circular arcuate part which is bounded by and entered into through a narrow passageway defined and formed by gripping means comprising two elastically deformable facing projections defined in said end wall, each said tenon shank being shaped and dimensioned such that said tenon shank can be forced through said narrow passageway and past said projections and said tenon shank deforms said projections as its passes and such that said tenon shank can be introduced into and retained in said major circular arcuate part of said opening in said end wall of said female element, each said female element having inner walls defining a hollow space for receiving a said tenon polygonal head, said polygonal head being shaped and sized such that said faces of said polygonal head engage and are guided and positioned by said inner walls of a said female element.

2. A construction kit according to claim 1, comprising female elements of various lengths.

3. A construction kit according to claim 1, further comprising a plurality of axles, said female elements having side walls and having holes spaced apart regularly along said side walls to receive said axles.

4. A construction kit according to claim 1, further comprising a plurality of axles, said male elements having through bores extending centrally through said faces of their said cubic bodies and through said securing members on said cubic bodies to receive said axles.

5. A construction kit according to claim 1, in which at least some of said male elements are formed of two hollow sleeve-like pieces fitted one in the other, one of said sleeve-like pieces forming four said faces of said cubic body and carrying four said securing members, and the other of said sleeve-like pieces forming two opposite said faces of said cubic body and carrying two said securing members and said other sleeve-like piece being inserted in said one sleeve-like piece, with its said securing members projecting out of said cubic body.

6. A construction kit according to claim 1, in which said male and female elements are comprised of a resilient material.

7. A construction kit according to claim 6, in which said male and female elements are comprised of moulded plastics material.

8. A construction kit according to claim 1, wherein said tenon polygonal head has opposite rectilinear edges which are slidably receivable in and bear against corresponding said inner walls of the female element to prevent rotation between said elements.

* * * * *